UNIT STATE ...

United States Patent
Masak et al.

[15] 3,704,465
[45] Nov. 28, 1972

[54] ANGULAR POSITION DETERMINING SYSTEM COMPENSATED FOR DOPPLER

[72] Inventors: Raymond J. Masak; Herbert F. Baurle, both of East Northport, N.Y.

[73] Assignee: Hazeltine Corporation

[22] Filed: Aug. 28, 1970

[21] Appl. No.: 67,820

[52] U.S. Cl.................343/102, 325/65, 343/100 SA, 343/108 M
[51] Int. Cl..................................................G01s 1/02
[58] Field of Search......343/100 SA, 106 D, 113 DE, 343/102, 108 M, 16 R; 325/65

[56] References Cited

UNITED STATES PATENTS 3,234,554  2/1966  Earp et al..............343/108 M
3,518,669  6/1970  Vogel......................343/16 R Primary Examiner—Benjamin A. Borchelt
Assistant Examiner—Richard E. Berger
Attorney—Edward A. Onders

[57] ABSTRACT

Disclosed are systems for determining the true angular position of a target with respect to a reference location. One such system employs a novel array of antenna units at the reference location. The units are uniquely excited by a pulse type signal in two opposite predetermined sequences to produce a pair of radiated pulse trains. A target located in the field of this array is illuminated by these radiated pulse trains each of which has a phase distribution proportional to the angular position of the target with respect to the array and opposite in sense to that of the other. Furthermore, the frequency of each pulse train undergoes a doppler shift due to the radial velocity, if any, of the target with respect to the array and therefore the ambiguity due to such shifts can be compensated for by detecting the phase distribution of each pulse train and processing the information obtained. In this manner an indication of the target's true angular position, free from doppler ambiguities, can be provided either at the reference location alone, the target alone, or at both the reference location and the target.

14 Claims, 12 Drawing Figures

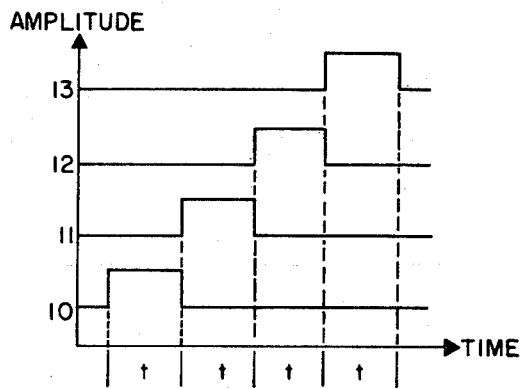
FIG. 4-a
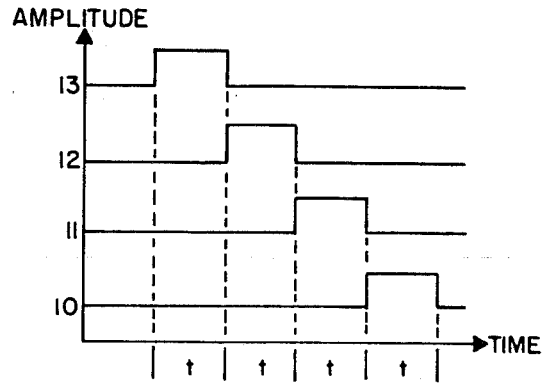
FIG. 4-b
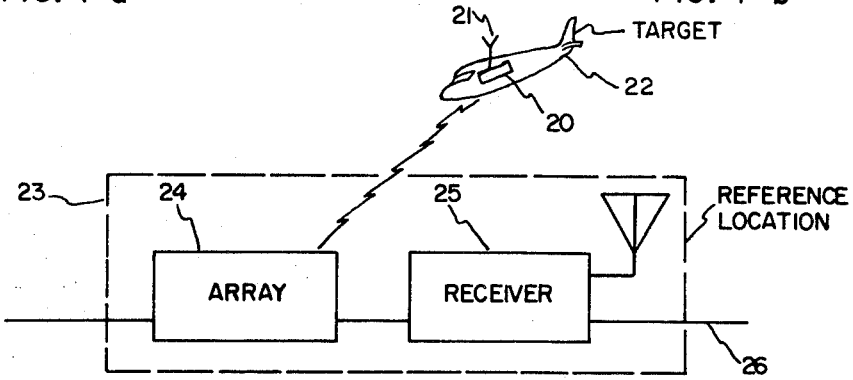
FIG. 5
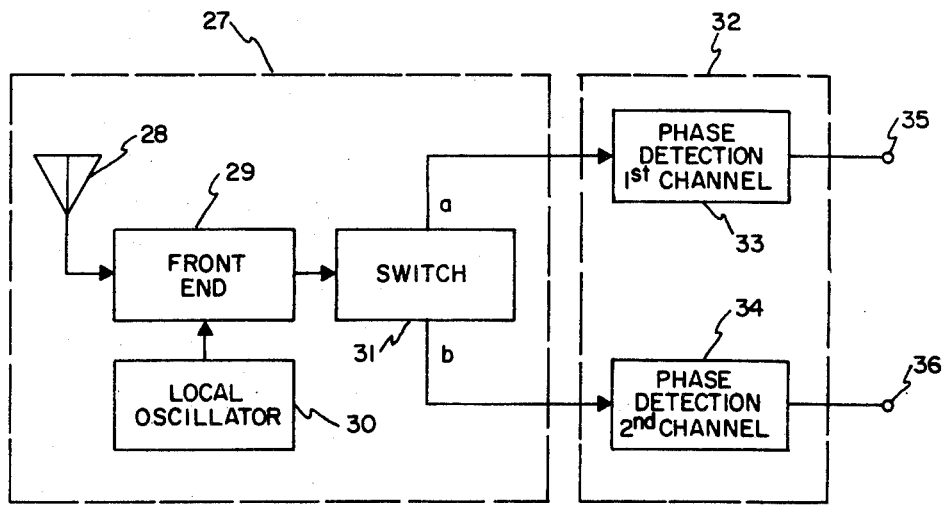
FIG. 6

ANGULAR POSITION DETERMINING SYSTEM COMPENSATED FOR DOPPLER

CROSS-REFERENCE TO RELATED APPLICATIONS

The present invention relates to angular position determining systems such as those described in applicants' simultaneously filed copending U. S. application, Ser. No. 67,821, filed Aug. 28, 1970, entitled "Angular Position Determining System Using Time Scanned Arrays" which is assigned to the same assignee as the present application.

BACKGROUND OF THE INVENTION

This invention relates to signal transmitting and receiving systems for determining the true angular position of a target with respect to a reference location and more specifically to such a system capable of compensating for the doppler ambiguity due to the relative motion of the target and the reference location.

Present angular position determining systems generally employ scanning beams, formed by variably phased arrays or rotating antennas, to obtain the required angular position information. In applicants' aforementioned copending application, entitled "Angular Position Determining System Using Time Scanned Arrays," a novel system is disclosed which utilizes a time scanned array and thereby provides several advantages over conventional scanning beam systems. These as well as other advantages over prior art systems are incorporated into the invention herein described.

A time scanned array is one in which a predetermined broad radiation pattern is formed in space, instead of the more conventional well defined scanning beam. The angular position of targets in the field of this type of array can be obtained from the nature of the radiation pattern at the position of the target. Therefore, one advantage of this type of system is that it is capable of providing positional information for a plurality of targets simultaneously.

The time scanned array systems disclosed in the prior art in general and by C. W. Earp in particular, have several disadvantages which it is an object of applicants' invention to overcome.

Some of the difficulties in prior art systems in general are their inability to provide compensation for ambiguities due to the doppler velocity component of a target and the inherent frequency instability of various system components (i.e. oscillators).

Another problem is the susceptibility of these systems to multipath transmissions as explained in said copending application. This susceptibility is caused by several inadequacies in the prior systems, one of which is the specific requirement for a separate reference signal transmitted from the array as explained in C. W. Earp's prior art U.S. Pat. No. 3,226,718. This reference signal being omnidirectional in nature causes severe multipath transmissions to be detected at the receiver and, as is well known in the art, such transmissions generally interfere with and prevent accurate angular position determination. Furthermore the disclosed receivers do not incorporate an adequate method for distinguishing the desired information signals, received from the array, from the multipath transmissions caused by reflections from these information signals.

In order to overcome these difficulties the present invention utilizes a time scanned array whose units are excited in two opposite predetermined sequences resulting in a radiation pattern from which, not only target position but also doppler velocity component can be obtained. Furthermore this unique type of radiation pattern enables compensation for other inaccuracies in the system, for example, those due to frequency instability. The system avoids many of the aforementioned prior art multipath problems since no separate reference signal is utilized in obtaining angular information and since in several embodiments a special electrical beam type signal (described hereinafter) is formed in the receiver, one of whose purposes is to enable unwanted multipath transmissions to be rejected. Furthermore, since the invention does not require a reference signal for accurate position determination, such a signal may be transmitted for convenience, without interfering with the accuracy of the positional determination itself.

SUMMARY OF THE INVENTION

Objects of the invention therefore are: to provide a system capable of determining the true angular position of a target, with respect to a reference location; to provide such a system specifically capable of determining and compensating for doppler ambiguities due to the relative motion of the target and the reference location; to provide such a system capable of deriving such angular information to either at the target, the reference location, or both; to provide such information at a relatively high data rate and to provide such a system capable of operating in a multipath environment.

A further object of the invention is to provide a time scanned array antenna useful in such an angular position determining system.

A still further object of the invention is to provide receivers useful in such an angular position determining system.

In accordance with the invention, there is provided a system for determining the true angular position of a target with respect to a reference location which system compensates for doppler ambiguities due to the relative motion of the target with respect to the reference location, comprising an array of antenna units at the reference location; means for supplying a first pulse type signal to selected units of the array in a first predetermined sequence and with a first selected phase relationship to cause a first corresponding pulse type signal to be radiated from each unit during a time interval unique to that unit; means for supplying a second pulse type signal to selected units of the array in a second predetermined sequence, opposite in order of units to the first predetermined sequence, and with a second selected phase relationship to cause a second corresponding pulse type signal to be radiated from each unit during a time interval unique to that unit, whereby a target located in the field of the array is illuminated by a pair of pulse trains each having a phase distribution opposite in sense to that of the other and proportional to the angular position of the target with respect to the array and each having a doppler component approximately equal to the doppler component of the other; means for receiving the pair of pulse trains which have illuminated the target; and means for detecting the phase distribution and doppler component of each of the received pulse trains and for providing a pair of output indications, each representative of one of the detected phase distributions and doppler components, whereby the true angular position of the target with respect to the array and therefore with respect to the reference location is represented by the relationship between the pair of indications.

BRIEF DESCRIPTION OF THE DRAWINGS

FIGS. 4A and 4B are graphical illustrations of the time of arrival of a pulse type signal at the units of the array of FIG. 3.

FIG. 5 is an illustration of an embodiment of the invention wherein angular position information is derived at both a target and a reference location.

FIG. 6 is a block diagram of a receiver built in accordance with the teachings of the invention.

DESCRIPTION AND OPERATION OF THE SYSTEMS SHOWN IN FIGS. 3, 5 AND 6

It will be recognized that applicants' invention can be employed in any situation where it is desired to obtain the angular position of one or more targets with respect to a reference location and that the description contained herein specifically refers to a plurality of aircraft as targets only by way of example.

Figure 1:
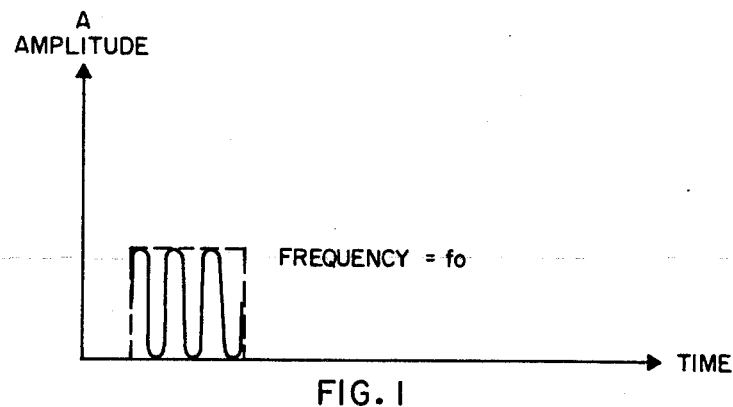
FIG. 1 is a graphical illustration of a pulse type signal useful in the invention.
Figure 2:
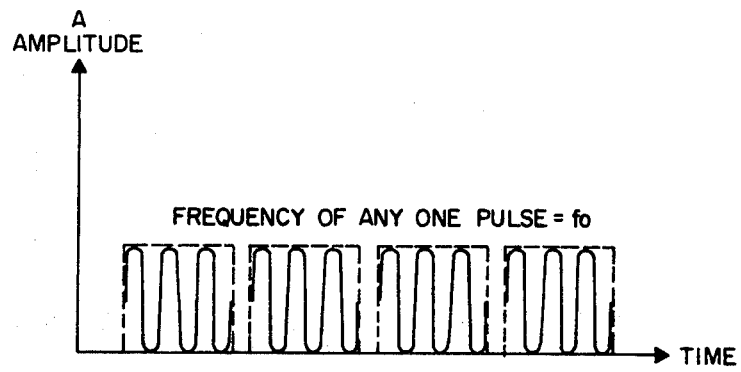
FIG. 2 is a graphical illustration of a typical train of pulses radiated by a time scanned array antenna.

Since the embodiment herein described employs a time scanned array antenna of the type more completely described in applicants' aforementioned copending application "Angular Position Determining System Utilizing Time Scanned Arrays," concepts useful in understanding this array are summarized below. In brief a time scanned array built in accordance with this invention is one in which each unit of an array antenna radiates a predetermined pulse type signal, such as the single burst of carrier frequency $f_0$ shown in FIG. 1, during a time interval unique to that unit. The radiation pattern created by a single unit of the array is therefore recreated a number of times equal to the number of units in the array in a specific sequence, since each unit is separately excited by the pulse signal. Targets, such as aircraft, in the field of the array are therefore illuminated not by the single pulse of FIG. 1 but by a composite radiation pattern which represents a train of pulses each of frequency $f_0$ such as shown in FIG. 2. Furthermore the phase distribution, i.e. phase relationship between successive pulses in this pulse train, is representative of the angular position of the target with respect to the broadside axis of the array and therefore with respect to the location of the array herein called "reference location." Targets located on the broadside axis of the array will sense the same phase distribution as existed between the pulses as they excited the units of the array, since each unit of the array is approximately the same distance from the target. Targets off the broadside axis will sense a phase distribution which differs from the broadside phase distribution and is proportional to their angular position since each unit of the array will be at a small but perceptably different distance from the target.

As in applicants' copending application, linear, planer and circular as well as any other type arrangement for array antennas can be used in the time scanned configuration depending upon the area of and type of coverage required. Furthermore the arrays can be adapted to obtain azimuth or elevation angles or both by suitable positioning with respect to the reference plane. For example, a vertical (with respect to ground), linear, array of antenna units would provide coverage over the sector of space covered by a single one of the units radiating alone, and the array would provide information concerning elevation angle of aircraft illuminated by the array.

Figure 3:
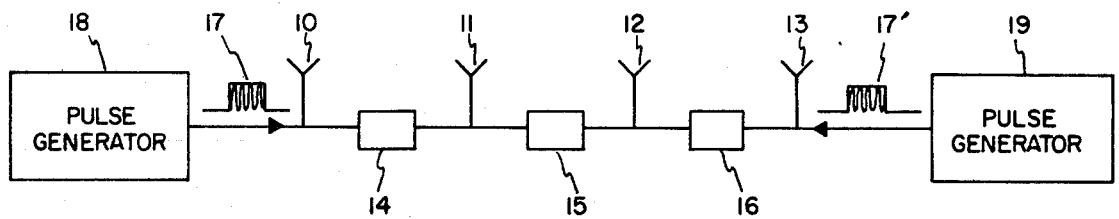
FIG. 3 is a block diagram illustrative of a time scanned array built in accordance with the teachings of the invention.

Referring now to FIG. 3 which illustrates by way of example an embodiment of the invention which utilizes an array of four antenna units 10, 11, 12 and 13 (each unit being a single radiating element) separated by delay lines 14, 15 and 16 having fixed delays equal to the width of the pulse 17 supplied to unit 10 by pulse generator 18. Pulse generator 18, which supplies unit 10 with pulse 17 (similar to that of FIG. 1) together with delay lines 14, 15 and 16 comprise means for supplying a first pulse type signal to selected units of the array in a first predetermined sequence and with a first selected phase relationship to cause a first corresponding pulse type signal to be radiated from each unit during a time interval unique to that unit. As will be recognized by those skilled in the art, pulse generator 18 may be a transmitter or any conventional pulse generator or other suitable pulse supplying means, and delay lines 14, 15 and 16 could be replaced by a single multitap delay line. Alternatively the delay lines may be replaced by mechanical or electrical switching systems or any other method of exciting each of the selected units of the array in the first predetermined sequence and with the first selected phase relationship. In the embodiment of FIG. 3 the delay lines (14, 15 and 16) which provide several unique advantages over switching systems, as described in applicants' aforementioned copending application, inherently accomplish proper sequencing because their delay is fixed to be equal to the pulse width of pulse 17. This insures that each unit is individually excited since the pulse supplied to one unit of the array will be completely radiated before the pulse propagates through the delay line to the next unit. FIG. 4a shows the time of arrival at each unit of the array of the envelope of pulse 17 for the first predetermined sequence. Since the width of pulse 17 and the delay of delay lines 14, 15 and 16 are equal to $(t)$, no two elements of the array receive pulse 17 simultaneously and yet each unit of the array radiates immediately after the previous unit stops. In this case therefore the phase shift introduced between units of the array is zero, thus establishing a reference phase distribution along the broadside axis of the array.

Means for supplying a second pulse type signal 17' to selected units of the array in a second predetermined sequence opposite in order of units to the first predetermined sequence and with a second selected phase relationship to cause a second corresponding pulse type signal to be radiated from each unit during a time interval unique to that unit is represented in the embodiment of FIG. 3 by pulse generator 19, which may be identical to pulse generator 18 or may be any other suitable pulse supplying means, in combination with delay lines 14, 15 and 16. In the embodiment of FIG. 3 the selected units of the array for the first sequence and for the second sequence are the same units. In this case, of course, the same delay lines supply the units of the array with pulse 17 and 17' in both the first and second sequences. Alternatively as will be recognized by those skilled in the art, an array can be constructed in accordance with the invention by having the first pulse type signal excite a first series of units and further having a second pulse type signal excite in an opposite order, a second series of similar units which may be conveniently positioned parallel to the first series thereby causing a pair of pulse trains to be radiated as will be described hereinafter.

In the specific embodiment of FIG. 3 where the first and second excited units are the same ones, pulse generator 19 may alternatively and in its simplest form, be a reflective termination, which resupplies pulse 17 to the originally excited units of the array in an opposite order. One advantage of this configuration is to simplify the overall operation and cost of the system. FIG. 4b shows the resulting time of arrival at the units 10, 11, 12, and 13 of the array when pulse 17 is simply resupplied to those units via pulse generator 19. Note that the order of excitation is opposite to that of FIG. 4a. If desired the pulse supplied by pulse generator 19 may be delayed in order to effect some separation between the first and second radiated pulse trains described hereinafter.

The result of exciting the units of the array, as explained above, is to produce in space two composite radiation patterns each of which represents a pulse train. As previously described the angular position of a target in the field of the array is proportional to the phase shift between the pulses of each of the pulse trains. An important feature in this case, however, is that the phase distribution of each radiated pulse train is of an opposite sense. These opposite sense phase distributions (i.e. equal magnitude but opposite polarity) cause corresponding opposite sense frequency shifts in the frequency of the pair of pulse trains received at the target. The effect of the doppler shift (i.e. shift in the carrier frequency due to the relative velocity of the target with respect to the array) is approximately the same on both pulse trains and therefore the desired true angular information can be obtained from the frequency separation (i.e. difference) between the two received pulse trains. The shift in frequency due to the doppler velocity component can also be obtained since the mean frequency between the frequencies of the two received pulse trains is equal to the sum of carrier frequency and the doppler shift. Other frequency instabilities like doppler ambiguities have no effect on position determinations because the frequencies of the two received pulse trains are shifted by the same amount and sense due to these ambiguities and therefore cancel out when frequency difference is measured. For example an aircraft having a radial velocity with respect to the array will be illuminated by a pair of pulse trains. The first pulse train has a phase distribution representative of the angular position of the aircraft with respect to the array which will cause a shift in the frequency of the entire pulse train proportional to its angular position with respect to the array. The second pulse train has a phase distribution also proportional to the angular position of the aircraft with respect to the array, however the phase distribution although equal in magnitude to the phase distribution of the first pulse train, is opposite in sense to that of the first pulse train, therefore causing a frequency shift in the second pulse train opposite in sense to that of the first. The true angular position is represented by the difference in the frequency of the two pulse trains caused by these opposite sense shifts. Since doppler and other frequency instabilities contribute equally to the frequency spectrum of both pulse trains the ambiguities due to them have no effect on frequency difference and therefore angular position determination. The receivers herein described are adapted to obtain angular information from such a pair of pulse trains and to compensate for the doppler shift as well as other frequency instabilities and thereby avoid many of the disadvantages of prior art systems.

In the embodiment of FIG. 5 a receiver 20 which includes omni-antenna 21 is carried in a target shown as aircraft 22. In this manner angular information can be provided to the aircraft from the reference location 23 which contains the array 24 and in the embodiment described is located on a ground plane 26 It will also be recognized that the pair of pulse trains can be either reflected or received and retransmitted by the target to the reference location in order to provide angular information concerning this target as well as others in the field of the array to the reference location. In the embodiment of FIG. 5 a receiver 25 has been included at the reference location. Note that the receiver could be remote from the array if desired without affecting angular position determination for targets in the field of the array. Also note that it is not necessary to include a receiver at the target if there is no need for the target to obtain angular information. Furthermore since the systems herein described incorporates the advantages of the invention of aforementioned copending application and of time scanned arrays in general, it is apparent that such angular information can be provided concerning a large number of targets simultaneously although only one is shown in FIG. 5.

Another feature of the aforementioned copending application adaptable for use in the present system the ability to individually code the pulses of the transmitted pulse train in order to convey selected other information to the target during the same transmission.

Turning now to novel receiving apparatus useful in a system for determining the angular position of targets with respect to the reference location, FIG. 6 shows a block diagram of an embodiment of a receiver useful in a system built in accordance with the invention. Shown as dotted box 27 are means for receiving the pair of pulse trains which have illuminated the target. In the embodiment of FIG. 6 this means are shown as a conventional omnidirectional antenna 28 in combination with a receiver front end 29 and local oscillator 30 which combination provides a pair of pulse trains at the input to switch 31 as electrical signals at a convenient frequency for further detection in a manner well known to the art. Switch 31 is utilized to apply the first received pulse train to one portion of detecting means 32 via terminal a and the second received pulse train to a second portion of detecting means 32 via terminal b. The time of activation for switch 31 may be controlled in any manner desired for example by transmitting a separate sync signal, at a time between the first and second pulse train, reception of which causes switch 31 to switch the output of front end 29 from position a to position b and vice versa.

In order to provide additional gain in receiving means 27, an array antenna having delay lines between units may be utilized in place of omni-directional antenna 28. This feature is especially useful where a receiver is to be incorporated at the reference location since here the original array used for transmission can additionally be used for reception as described in said copending application wherein an array is used to assemble the pulse train into a staircase function providing the desired signal gain.

Shown in dotted box 32 are means for detecting the phase distribution and the doppler component of each of the received pulse trains and for providing a pair of output indications each representative of one of the detected phase distributions and doppler components. Block 33 represents one portion (i.e. first channel) of means 32 and in the embodiment illustrated is connected to terminal a of switch 31 and therefore provides an output indication on terminal 35 of the first received pulse train's phase distribution and doppler component.

Block 34 represents a second portion (i.e. second channel) of means 32 which is connected to terminal b of switch 31 and therefore provides an output indication on terminal 36 representative of the second received pulse train's phase distribution and doppler component.

In its simplest form each of these blocks (33 and 34) may comprise a wide bandpass filter, tuned to approximately the carrier frequency, and a frequency counter, which determines the effective frequency of each received pulse train. The phase shift in each of the pulse trains will result in a frequency shift across the entire pulse train, which frequency shift will be proportional to angular position as was the phase distribution and therefore easily detected by the counter. The output indication on terminals 35 and 36 can then be compared or combined either visually (for example by reading off the counters) or electrically and if desired the frequency difference determined thereby providing a final output indication representative of true angular position of the target, since as previously stated frequency difference is proportional to angular position. Since no reference signal is included, the receiver being turned to approximately the carrier frequency, the prior art multipath problems due to these reference signals are avoided.

DESCRIPTION AND OPERATION OF THE ALTERNATIVE RECEIVERS OF FIGS. 8, 9, AND 10

Figure 7:
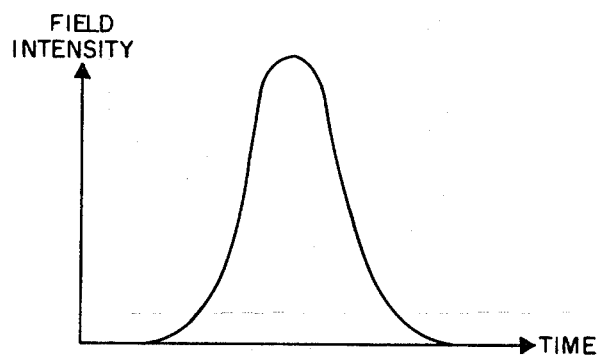
FIG. 7 is a graphical illustration of a field intensity characteristic sensed by a target when illuminated by a conventional scanning beam.

In certain prior art angular position determining systems a well defined scanning beam scans through a sector of space illuminating a target for a short instant of time and then proceeding on through the sector to the next target. At any one target a plot of field intensity vs. time for a scanning beam system would be similar to that shown in FIG. 7. As previously stated, one of the advantages of applicants' invention is that no such variation in field intensity exists since all targets in the field of the array are illuminated at substantially the same time by the broad radiation pattern of the array. It has been found by the applicant however, that identical resolution capability to the scanning beam system can be obtained by forming in the receiver an electrical signal which is the equivalent of the field intensity characteristic (an example of which is shown in FIG. 7) which would have been formed at a target by a scanning beam (for example from the array of FIG. 3 utilized in a conventional phased array form) illuminating the target. This electrical signal herein called "-beam type signal" once formed in the receiver is an aid in distinguishing between multipath transmissions since the particular field intensity plot of FIG. 7 and therefore its equivalent electrical signal can be identified in the receiver and locked onto during target tracking preventing multipath transmissions from interfering. In addition, formation of this signal allows the receivers herein described to locate the angular position of targets from a single transmission of aforementioned first and second pulse trains, thereby allowing the entire system to operate in intermittent modes since the desired angular information is conveyed to the receiver on a single transmission of the pair of pulse type signals.

Figure 8:
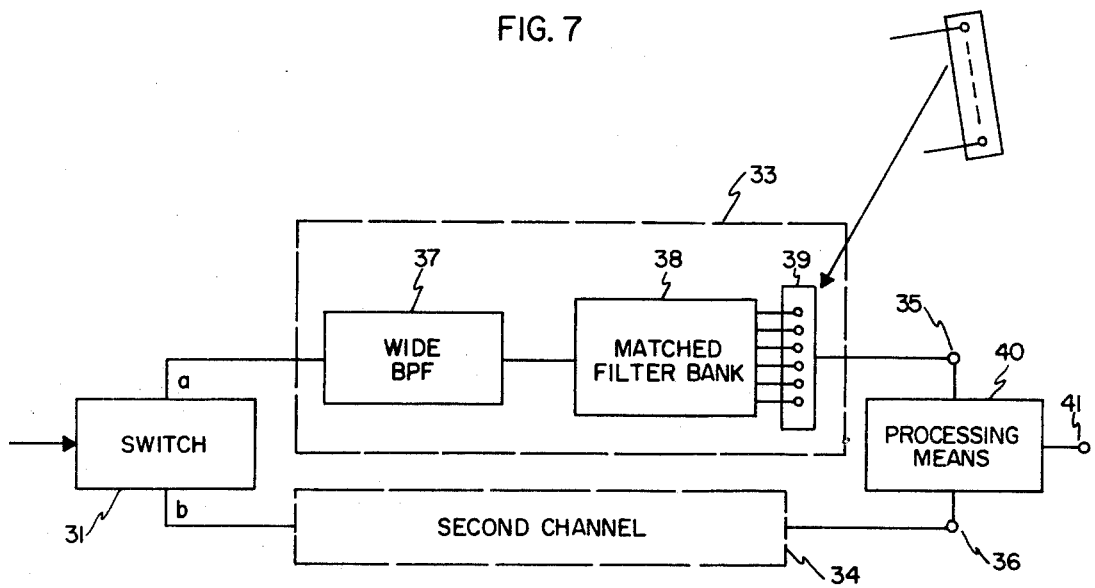
FIGS. 8, 9, and 10 are block diagrams of different types of detection means useful in the receiver of FIG. 6.
Figure 9:
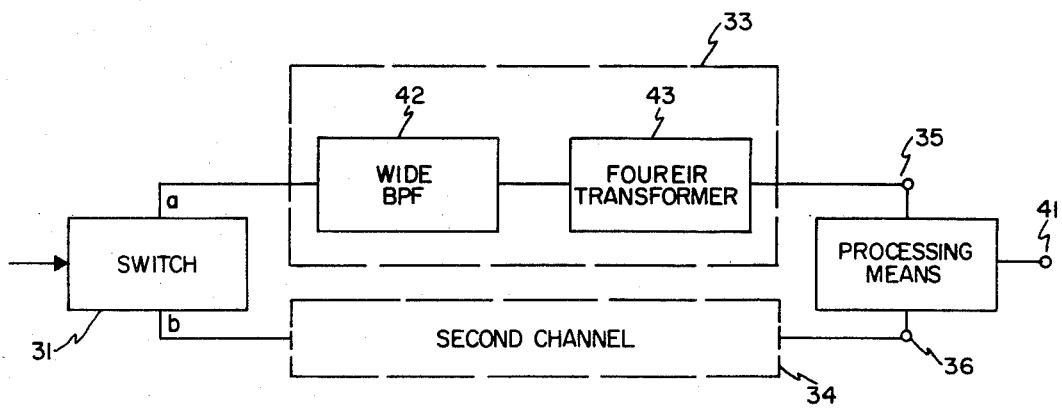
Figure 10:
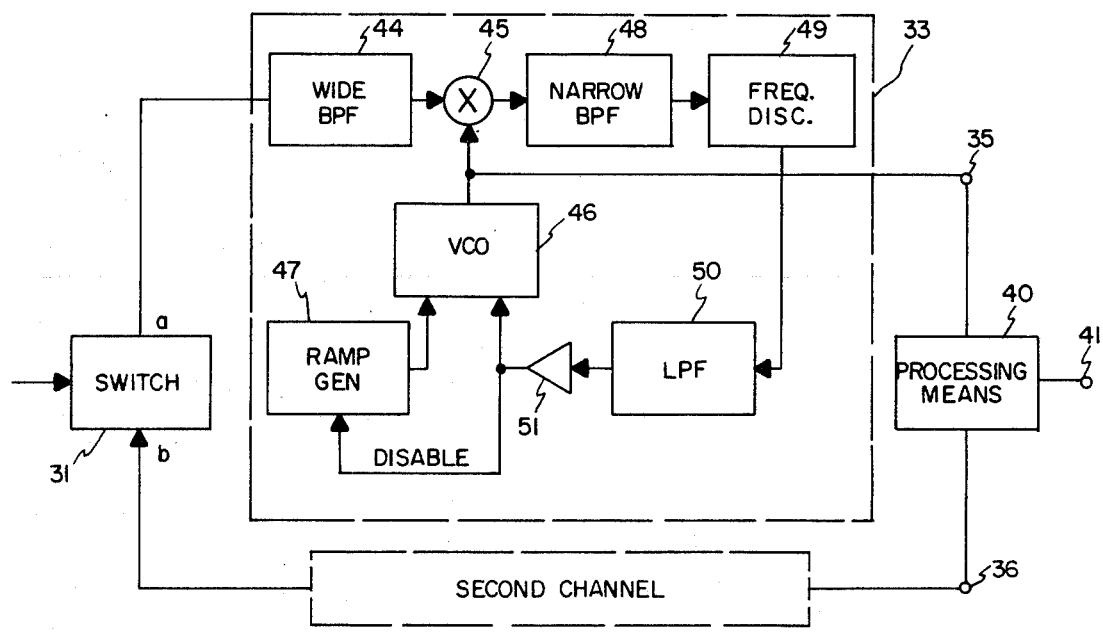

Three examples of novel receivers incorporating this technique are shown in FIGS. 8, 9 and 10. Only one channel of the detecting means 32 of each receiver is shown in detail, it will be recognized however that the second channel may be, and in the embodiments illustrated is, substantially identical to the first channel.

Figure 11:
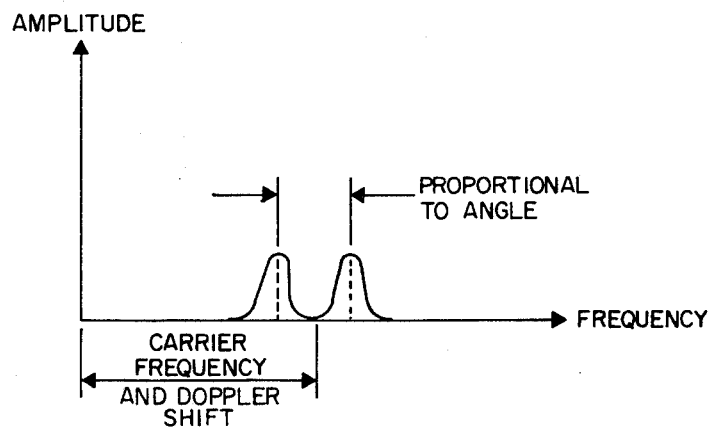
FIG. 11 is a graphical illustration of the output indication obtained in the embodiment of FIG. 8 and is similar to those obtained in the embodiments of FIG. 9 and FIG. 10.

Referring to FIG. 8 first channel 33 of means 32 is shown as comprising a plurality (i.e. bank) of matched filters 38 which may for example consist of a multitap delay line and a phase matrix. The pulse train is fed to the filters 38 from switch 31 through bandpass filter 37, which is centered approximately about the carrier frequency. Since each filter is adapted to add the pulses of the pulse train and produce an output signal for a pulse train having a particular phase distribution, only the filter matched to the phase distribution sensed by the target will provide an output indication on one of the terminals 39. Since this output indication is formed in much the same way that a phased array antenna forms a scanning beam, in space (pulses combined according to their phase to produce a maximum contribution) the output indication will appear on the appropriate terminal 39 as the aforementioned beam type signal. The output of the second channel 34 will be a similar beam type signal representing an opposite sense phase distribution. If the two output indications were displayed graphically (or on a display device) such as illustrated in FIG. 11 whose horizontal axis represents frequency and therefore phase distribution in discrete steps, then the true angular position of the target is represented by the difference in frequency between the displayed beam type signals one of which results from the first channel and the other resulting from the second channel. Furthermore the doppler shift plus carrier frequency is proportional to the mean frequency along the axis between the two signals displayed. Once it is recognized that the relation between these two signals is representative of the true angular position of the target a processing circuit 40 which represents means for processing the pair of output indications to compensate for doppler ambiguities and to provide a final output indication of true angular position of the target on terminal 41, may be included. The function of circuit 40 may be performed by a digital computer or a difference circuit or by displaying the two output indications on a scope such that a scale of the scope represents phase distribution and the difference can be read therefrom.

Referring now to FIG. 9 a second novel detecting means 32 useful in a receiver is shown which employs in first channel 33 a wide bandpass filter 42 centered approximately about the carrier frequency to eliminate extraneous noise. Further included is a Fourier transformer 43 which, as is well known to the art, has the ability to accept an input signal and provide an output indication in real time which represents the mathematical Fourier transform of the input signal. In effect the Fourier transformer performs a spectrum analysis on the input signal and therefore the output indication in this case is representative of the center frequency of the received pulse train which has been shifted from carrier frequency due to the position of the target and due to the doppler velocity of the target. As in the previous receiver each channel 33 and 34 are fed from the appropriate terminal of switch 31 and an output indication from each channel is provided on terminals 35 and 36. However in this case the output indication is presented along the real time axis and therefore is more easily utilized for display purposes than the previous indication. Referring again to FIG. 11 a similar graph can be drawn for the output of the Fourier transformer detector of FIG. 9, however in this case the horizontal axis would represent time rather than frequency. The mean distance between the two signals displayed is still proportional to carrier frequency plus doppler and the difference in time between the position of the two signals along the axis would represent true angular position. As in the previous case the output of processing circuit 40 is a final output indication compensated for doppler. However now it is provided on terminal 41 in real time.

A third detecting means 32 useful in a receiver built in accordance with the invention is shown in FIG. 10. This system provides several advantages over the previous ones in that the entire detection process takes place in the frequency domain thereby providing relatively accurate angular position determination over a continuous period of time. First channel 33 of detecting means 32 contains a wide bandpass filter 44 centered approximately about the carrier frequency which as in the previous cases, accepts the pulse train from switch 31 and filters out extraneous noise. Further included is mixer 45 which is supplied with a signal from voltage controlled oscillator 46 as well as the pulse train from switch 31. Prior to receiving any information containing signals from the array antenna, a ramp generator 47 is connected to the voltage controlled oscillator in order to cause the output of the oscillator to vary from zero to a frequency equal to the bandwidth of bandpass filter 44. This is done in order to match the frequency of any possible received signals to the characteristic defined by narrow bandpass filter 48 since the pulse train supplied to bandpass filter 44 from switch 31 may not be centered about the same frequency as narrow bandpass filter 48. Bandpass filter 48 is matched to the characteristic which would be created when the pulses of the pulse train are combined to form the aforementioned beam type signal therefore if the received signals do not combine in filter 48 to match the characteristic of the filter they are rejected and no output indication is provided. Upon reception of a proper signal, (i.e. one that matches the characteristic of the filter 48) frequency discriminator 49 in combination with low pass filter 50 generates a control voltage which is representative of the center frequency of the received signal. This control voltage is applied through amplifier 51 to a control input of oscillator 45 disabling the ramp generator from functioning and, in effect, locking the received signal into the characteristic of bandpass filter 48 since should the target change in angle or doppler causing a change in frequency of the received pulse train, the change would be sensed by discriminator 49 and the frequency of oscillation of oscillator 46 would additionally be changed through the feedback loop to compensate for the change in target angle causing the resulting signal at the output of the mixer 45 to readjust to take into account this change. An output indication which is representative of the angular position can be taken at the output of the oscillator 46 and fed to terminal 35 since the frequency at this point necessarily varies with changes in frequency of the received signal, which changes represent changes in phase distribution and therefore changes in angular position. It will be noted that once bandpass filter 48 receives a signal which is matched to its characteristic and the remainder of the feedback loop locks in, no additional multipath signals, which necessarily are received delayed from the actual transmission, can interfere with this tracking process generated in the loop.

Once again the output indication from the first channel 33 on terminal 35 and from the second channel 34 on terminal 36 will differ by an amount due to the opposite sense phase distributions of the two received pulse trains. However, looking again at the graph of FIG. 11, the horizontal axis of which represents frequency, and therefore the center frequency of each of the electrical signals shown on the graph and obtained at the output of oscillator 46 represent the angular position plus doppler component for each channel. In this case therefore the median frequency between the two signals represent carrier frequency plus doppler and the difference in frequency represents true angular position. Processing circuit 40 in this case would then operate in the frequency domain providing a final output indication on terminal 41 with a center frequency representative of true angular position.

This type of frequency discrimination is particularly advantageous in combination with a time scanning system since once a target is present in the field of the array it receives continuous information of its angular position substantially immune from multipath interference due to reflections of the original transmission.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A system for determining the true angular position of a target with respect to a reference location which system compensates for doppler ambiguities due to the relative motion of the target with respect to the reference location, comprising;

an array of antenna units at said reference location;

means for supplying a first pulse type signal to selected units of said array in a first predetermined sequence and with a first selected phase relationship to cause a first corresponding pulse type signal to be radiated from each unit during a time interval unique to that unit;

means for supplying a second pulse type signal to selected units of said array in a second predetermined sequence, opposite in order of units to said first predetermined sequence, and with a second selected phase relationship to cause a second corresponding pulse type signal to be radiated from each unit during a time interval unique to that unit, whereby a target located in the field of said array is illuminated by a pair of pulse trains each having a phase distribution opposite in sense to that of the other and proportional to the angular position of said target with respect to said array and each having a doppler component approximately equal to the doppler component of the other;

means for receiving the pair of pulse trains which have illuminated the target;

and means for detecting the phase distribution and doppler component of each of said received pulse trains and for providing a pair of output indications, each representative of one of said detected phase distributions and doppler components, whereby the true angular position of said target with respect to said array and therefore with respect to said reference location is represented by the relationship between said pair of indications.

2. A system in accordance with claim 1 wherein said angular position determining system further comprises means for processing said pair of output indications to provide a final output indication representative of said true angular position, compensated for the ambiguity in angular position due to said doppler components and substantially free from the effects of multipath.

3. A system in accordance with claim 2 wherein said receiving, detecting, and processing means are located at said reference location and wherein said target includes means for retransmitting said pair of radiated pulse trains to said reference location thereby providing said output indication at said reference location.

4. A system in accordance with claim 2 wherein said receiving, detecting, and processing means are located at said reference location and wherein said pair of radiated pulse trains are reflected by said target to said reference location thereby providing said output indication at said reference location.

5. A system in accordance with claim 2 wherein said receiving, detecting, and processing means are located at said target, thereby providing said target with an indication of its angular position with respect to said reference location.

6. An aircraft landing system which determines the true angular position of an aircraft with respect to a reference location which system compensates for doppler ambiguities due to the relative motion of the aircraft with respect to the reference location comprising:

an array of antenna units at said reference location;

means for supplying a first pulse type signal to a first unit of said array;

delay means for coupling said first pulse type signal to selected remaining units of said array in a first predetermined sequence and with a first predetermined phase relationship to cause a first corresponding pulse type signal to be radiated from each unit during a time interval unique to that unit;

means for supplying a second pulse type signal to a second unit of said array;

delay means for coupling said second pulse type signal to selected remaining units of said array in a second predetermined sequence, opposite in order of units to said first predetermined sequence, and with a second selected phase relationship to cause a second corresponding pulse type signal to be radiated from each unit during a time interval unique to that unit, whereby an aircraft located in the field of said array is illuminated by a pair of first and second pulse trains each having a phase distribution opposite in sense to that of the other and proportional to the angular position of said aircraft with respect to said array and each having a doppler component approximately equal to the doppler component of the other;

means for receiving the pair of first and second pulse trains which have illuminated the target;

means for detecting the phase distribution and doppler component of said received first and second pulse trains, by forming a pair of first and second electrical signals each having a waveshape substantially equivalent to the field intensity characteristic which would be formed at said aircraft by a predetermined scanning beam illuminating said aircraft, and for providing a pair of output indications each representative of the phase distribution and doppler component of a corresponding one of said pulse trains;

and means for processing said output indications to provide a final output indication representative of the true angular position of said aircraft with respect to said array and therefore with respect to said reference location, compensated for the ambiguities in position due to said doppler components and substantially free from the effects of multipath.

7. Apparatus usable in a system for determinig the true angular position of a target with respect to a reference location comprising:

an array of antenna units at said reference location;

means for supplying a first pulse type signal to selected units of said array in a first predetermined sequence and with a first selected phase relationship to cause a first corresponding pulse type signal to be radiated from each unit during a time interval unique to that unit;

and means for supplying a second pulse type signal to selected units of said array in a second predetermined sequence, opposite in order of units to said first predetermined sequence, and with a second selected phase relationship to cause a second corresponding pulse type signal to be radiated from each unit during a time interval unique to that unit, whereby a target located in the field of said array is illuminated by a pair of pulse trains each having a phase distribution opposite in sense to that of the other and proportional to the angular position of said target with respect to said array and each having a doppler component approximately equal to the doppler component of the other.

8. Apparatus usable in a system for determining the true angular position of a target with respect to a reference location comprising:

an array of antenna units at said reference location;

means for supplying a first pulse type signal to a first unit of said array;

delay means for coupling said first pulse type signal to selected remaining units of said array in a first predetermined sequence and having a first predetermined phase relationship to cause a first pulse type signal to be radiated from each unit during a time interval unique to that unit;

means for supplying a second pulse type signal to a second unit of said array;

and delay means for coupling said second pulse type signal to selected remaining units of said array in a second predetermined sequence, opposite in order of units to said first predetermined sequence, and with a second selected phase relationship to cause a second corresponding pulse type signal to be radiated from each unit during a time interval unique to that unit, whereby a target located in the field of said array is illuminated by a pair of pulse trains each having a phase distribution opposite in sense to that of the other and proportional to the angular position of said target in relation to said array and each having a doppler component approximately equal to the doppler component of the other.

9. Apparatus usable in a system for determing the true angular position of a target with respect to a reference location which system compensates for doppler ambiguities due to the relative motion of the target with respect to the reference location, wherein said target is illuminated with a pair of pulse trains each having a phase distribution opposite in sense to that of the other and proportional to the angular position of said target with respect to said reference location and each having a doppler component approximately equal to the doppler component of the other comprising:

means for receiving the pair of pulse trains which have illuminated the target;

and means for detecting the phase distribution and doppler component of each of said received pulse trains and for providing a pair of output indications, each representative of one of said detected phase distributions and doppler components, whereby the true angular position of said target with respect to said array and therefore with respect to said reference location is represented by the relationship between said pair of indications.

10. Apparatus in accordance with claim 9 wherein said angular position determining system further comprises means for processing said pair of output indications to provide a final output indication representative of said true angular position, compensated for the ambiguity in angular position due to said doppler components and substantially free from the effects of multipath.

11. Apparatus usable in a system for determining the true angular position of a target with respect to a reference location which system compensates for doppler ambiguities due to the relative motion of the target with respect to the reference location, wherein said target is illuminated with a pair of first and second pulse trains each having a phase distribution opposite in sense to that of the other and proportional to the angular position of said target with respect to said reference location and each having a doppler component approximately equal to the doppler component of the other, comprising:

means for receiving the pair of first and second pulse trains which have illuminated the target;

means for detecting the phase distribution and doppler component of said received first and second pulse trains, by forming a pair of first and second electrical signals each having a waveshape substantially equivalent to the field intensity characteristic which would be formed at said target by a predetermined scanning beam illuminating said target, and for providing a pair of output indications each representative of the phase distribution and doppler component of a corresponding one of said pulse trains;

and means for processing said output indications to provide a final output indication representative of the true angular position of said target with respect to said array and therefore with respect to said reference location and compensated for the ambiguity in angular position due to said doppler components.

12. Apparatus in accordance with claim 11 wherein said detecting means comprises a plurality of matched filters, each matched to the phase distribution due to a selected angular position, and together providing said first and second electrical signals from the particular filters matched to the phase distribution which correspond to said first and second received pulse trains.

13. Apparatus in accordance with claim 11 wherein said detecting means comprises a pair of Fourier transformers, each for detecting the phase distribution and doppler component of one of said pulse trains and each for developing an output indication in real time which is representative of said phase distribution and doppler component.

14. Apparatus in accordance with claim 11 wherein said detecting means comprises means including a pair of frequency lock loops for combining the pulses of said received pulse trains to form said pair of electrical signals, each signal having a center frequency representative of the phase distribution and doppler component of one of said pulse trains.

* * * * *